US012378967B2

(12) United States Patent
Nakatsuji et al.

(10) Patent No.: US 12,378,967 B2
(45) Date of Patent: Aug. 5, 2025

(54) VACUUM PUMP

(71) Applicant: Edwards Japan Limited, Chiba (JP)

(72) Inventors: Shigeyoshi Nakatsuji, Chiba (JP); Yoshiyuki Sakaguchi, Chiba (JP)

(73) Assignee: Edwards Japan Limited, Chiba (JP)

( * ) Notice: Subject to any disclaimer, the term of this patent is extended or adjusted under 35 U.S.C. 154(b) by 0 days.

(21) Appl. No.: 18/252,286

(22) PCT Filed: Dec. 3, 2021

(86) PCT No.: PCT/JP2021/044569

§ 371 (c)(1),
(2) Date: May 9, 2023

(87) PCT Pub. No.: WO2022/124240

PCT Pub. Date: Jun. 16, 2022

(65) Prior Publication Data

US 2024/0011496 A1 Jan. 11, 2024

(30) Foreign Application Priority Data

Dec. 11, 2020 (JP) .................................. 2020205721

(51) Int. Cl.
*F04D 19/04* (2006.01)
*F04D 17/16* (2006.01)
(Continued)

(52) U.S. Cl.
CPC ......... *F04D 19/042* (2013.01); *F04D 17/168* (2013.01); *F04D 19/044* (2013.01);
(Continued)

(58) Field of Classification Search
CPC .... F04D 19/042; F04D 19/044; F04D 17/168; F04D 29/023; F04D 29/547; F05D 2300/50212
See application file for complete search history.

(56) References Cited

U.S. PATENT DOCUMENTS

2018/0238346 A1* 8/2018 Vanapalli .............. F01D 25/246
2018/0335052 A1* 11/2018 Sakaguchi ............ F04D 19/046

FOREIGN PATENT DOCUMENTS

JP S58193932 A 11/1983
JP S63154891 A 6/1988
(Continued)

OTHER PUBLICATIONS

Ogami, Machine Translation of JP-2012145043 (Year: 2012).*
(Continued)

*Primary Examiner* — Courtney D Heinle
*Assistant Examiner* — Michael K. Reitz
(74) *Attorney, Agent, or Firm* — Theodore M. Magee; Westman, Champlin & Koehler, P.A.

(57) ABSTRACT

A vacuum pump includes a casing having an inlet port, and enclosing a rotating body, a thread groove stator which is substantially cylindrical and is disposed on an outer periphery of the rotating body, and a thread groove which is formed in at least one of an outer peripheral surface of the rotating body and an inner peripheral surface of the thread groove stator, the vacuum pump exhausting gas sacked from a side of the inlet port to outside of the casing by rotating the rotating body, wherein a binding means, which is formed of a material having a linear expansion coefficient lower than a linear expansion coefficient of a material of the thread groove stator and reduces radial deformation at a time of thermal expansion of the thread groove stator, is disposed on an outer periphery of the thread groove stator.

5 Claims, 6 Drawing Sheets

(51) Int. Cl.
*F04D 29/02* (2006.01)
*F04D 29/54* (2006.01)

(52) U.S. Cl.
CPC ......... *F04D 29/023* (2013.01); *F04D 29/547* (2013.01); *F05D 2300/50212* (2013.01)

(56) References Cited

FOREIGN PATENT DOCUMENTS

| | | | | | |
|---|---|---|---|---|---|
| JP | 5664253 | B2 * | 2/2015 | ........... | F04D 19/042 |
| JP | 2015031153 | A | 2/2015 | | |
| JP | 2019173759 | A * | 10/2019 | | |
| JP | 2022007580 | A * | 1/2022 | | |
| WO | 2015122215 | A1 | 8/2015 | | |
| WO | 2017086135 | A1 | 5/2017 | | |

OTHER PUBLICATIONS

Kogame, Machine Translation of JP-2022007580 (Year: 2022).*
Maejima, Machine Translation of JP-2019173759 (Year: 2019).*
PCT International Search Report dated Feb. 1, 2022 for corresponding PCT application Serial No. PCT/JP2021/044569, 2 pages.
PCT International Written Opinion dated Feb. 1, 2022 for corresponding PCT application Serial No. PCT/JP2021/044569, 2 pages.

* cited by examiner

VACUUM PUMP

CROSS-REFERENCE OF RELATED APPLICATION

This application is a Section 371 National Stage Application of International Application No. PCT/JP2021/044569, filed Dec. 3, 2021, which is incorporated by reference in its entirety and published as WO 2022/124240A1 on Jun. 16, 2022 and which claims priority of Japanese Application No. 2020-205721, filed Dec. 11, 2020.

FIELD

The present invention relates to a vacuum pump.

BACKGROUND

In a semiconductor manufacturing apparatus, a liquid crystal manufacturing apparatus, an electron microscope, a surface analysis apparatus, or a fine processing apparatus, it is necessary to bring an environment in the apparatus into a high vacuum state. A vacuum pump is used for bringing the inside of each of the above apparatuses into the high vacuum state.

In some vacuum pumps, there is a case where a thread groove pump is provided on a downstream side of a turbomolecular pump having a rotor blade and a stator blade. A so-called Holweck thread groove pump is constituted by an outer peripheral surface of a rotating body and a stator disposed on an outer periphery of the rotating body, and a thread groove is formed in the outer peripheral surface of the rotating body or an inner peripheral surface of the stator.

The discussion above is merely provided for general background information and is not intended to be used as an aid in determining the scope of the claimed subject matter. The claimed subject matter is not limited to implementations that solve any or all disadvantages noted in the background.

SUMMARY

Technical Problem

Incidentally, a technique for maintaining a temperature of the stator forming the thread groove pump at a temperature not less than a sublimation temperature of a reaction product has been devised in order to prevent the reaction product, which is generated in semiconductor manufacturing or the like, from being deposited. However, when the temperature of the stator disposed on the outer periphery of the rotating body becomes high, a gap amount between the rotating body and the stator is increased due to thermal expansion, and performance of the thread groove pump is reduced.

On the other hand, in the vacuum pump, besides exhaust performance, there are specification requirements such as an optimum internal temperature that corresponds to various manufacturing processes in the above-mentioned semiconductor manufacturing or the like. There are cases where, for the purpose of reducing inventory, it is requested to change a setting specification of the internal temperature in a single pump. In these cases, by the change of the setting specification of the internal temperature, the gap amount between the rotating body and the stator which is caused by the above-described thermal expansion changes. In the case where the gap amount changes to increase, the exhaust performance of the thread groove pump is reduced, which may cause a problem.

The present invention has been made in order to solve the above problem, and an object thereof is to provide a vacuum pump capable of effectively suppressing a reduction in performance caused by thermal expansion.

Solution to Problem

A vacuum pump according to the present invention which achieves the above object includes: a casing in which an inlet port is provided; a rotating body which is enclosed in the casing and is rotatably supported; a stator which is substantially cylindrical and is disposed on an outer periphery of the rotating body; and a thread groove which is formed in at least one of an outer peripheral surface of the rotating body and an inner peripheral surface of the stator, the vacuum pump exhausts gas sacked from a side of the inlet port to outside of the casing by rotating the rotating body, wherein a binding means, which is formed of a material having a linear expansion coefficient lower than a linear expansion coefficient of a material of the stator and reduces radial deformation at a time of thermal expansion of the stator, is disposed on an outer periphery of the stator.

Advantageous Effects of Invention

The vacuum pump configured in the manner described above has the binding means which reduces the radial deformation at the time of the thermal expansion of the stator, and hence it is possible to suppress an increase in the gap amount between the outer peripheral surface of the rotating body and the inner peripheral surface of the stator. Accordingly, the present vacuum pump can effectively suppress a reduction in the performance of the thread groove pump caused by the thermal expansion.

The binding means may be disposed at an end portion on a downstream side of the stator. With this, it is possible to suppress thermal expansion in a radial direction of the end portion on the downstream side of the stator of which an outer peripheral surface is not fixed on the downstream side, and effectively suppress a reduction in the performance of the thread groove pump.

The vacuum pump may have a plurality of specifications having different internal temperatures, and gap amounts, each of which is between the outer peripheral surface of the rotating body and the inner peripheral surface of the stator at a predetermined position in an axial direction of the vacuum pump in each of the individual specifications, may be made equal to each other by the binding means. With this, the present vacuum pump can effectively maintain the performance of the thread groove pump in the individual specifications having different internal temperatures.

Stress acting on the stator from the binding means at the time of the thermal expansion of the stator may be made less than yield stress of the material of the stator. With this, it is possible to effectively prevent damage to the stator which is bound by the binding means and receives the stress at the time of the thermal expansion.

The Summary is provided to introduce a selection of concepts in a simplified form that are further described in the Detail Description. This summary is not intended to identify key features or essential features of the claimed subject matter, nor is it intended to be used as an aid in determining the scope of the claimed subject matter.

DETAILED DESCRIPTION

Figure 1:
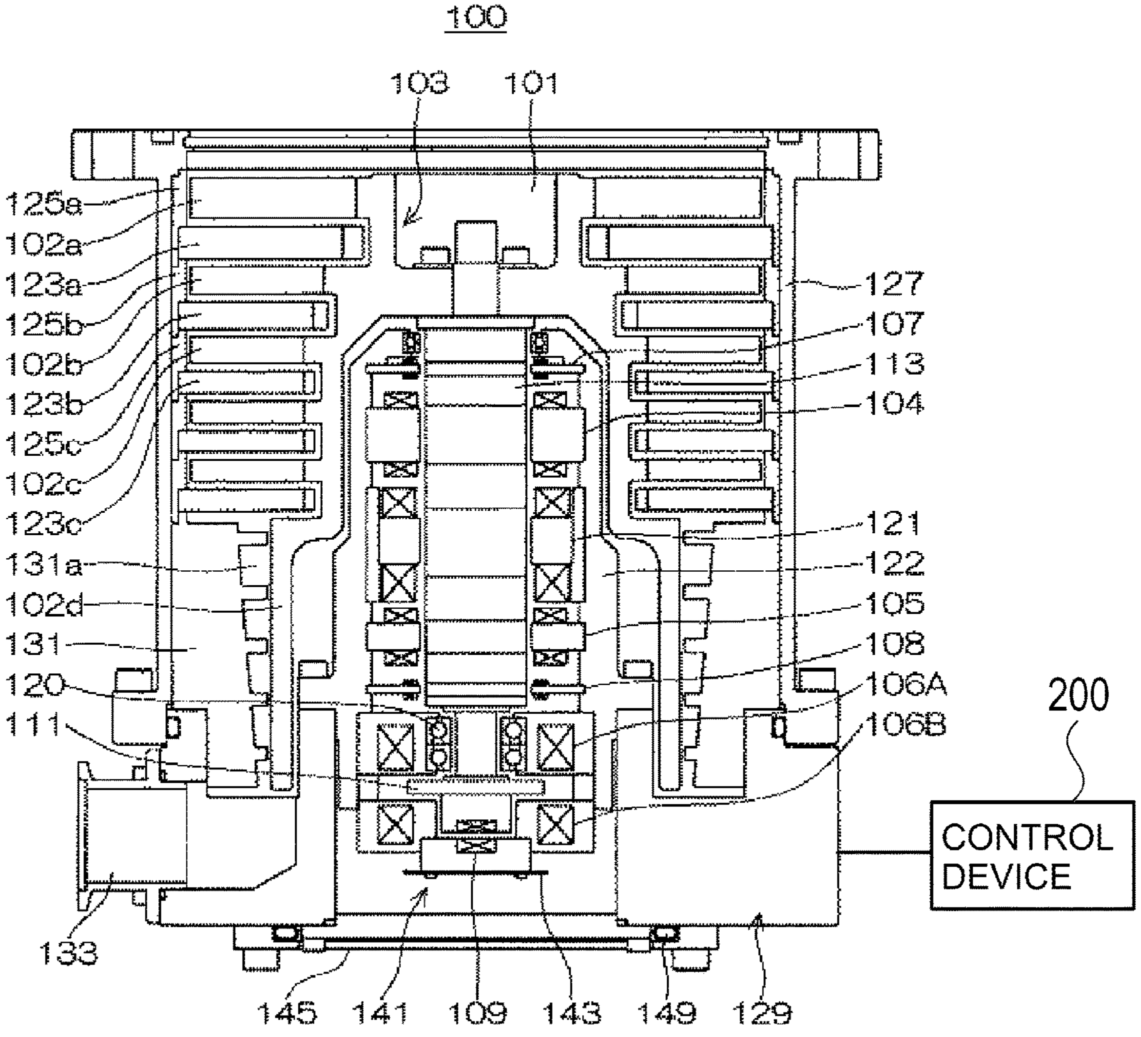
FIG. 1 is a longitudinal sectional view of a vacuum pump.

Hereinbelow, an embodiment of the present invention will be described with reference to the drawings. Note that there are cases where the dimensions of the drawings are exaggerated for the convenience of description and differ from the actual dimensions. In addition, in the present description and drawings, components having substantially the same functional configuration are denoted by the same reference numeral, and redundant description thereof will be omitted.

A vacuum pump according to the embodiment of the present invention is a turbo-molecular pump 100 in which a rotor blade of a rotating body which rotates at high speed flicks a gas molecule and gas is thereby exhausted. The turbo-molecular pump 100 is used to suck gas from a chamber of, e.g., a semiconductor manufacturing apparatus or the like and exhaust the gas.

FIG. 1 shows a longitudinal sectional view of this turbo-molecular pump 100. In FIG. 1, in the turbo-molecular pump 100, an inlet port 101 is formed at an upper end of a cylindrical outer tube 127. In addition, inside the outer tube 127, a rotating body 103 in which a plurality of rotor blades 102 (102*a*, 102*b*, 102*c* . . . ) which are turbine blades for sucking and exhausting gas are formed radially in multiple tiers in a peripheral portion is provided. A rotor shaft 113 is attached to the center of the rotating body 103, and the rotor shaft 113 is supported so as to be levitated in the air by, e.g., a five-axis control magnetic bearing and a position of the rotor shaft 113 is controlled also by the five-axis control magnetic bearing. In general, the rotating body 103 is constituted by a metal such as aluminum or an aluminum alloy.

Upper radial electromagnets 104 are disposed such that four electromagnets are paired in an X-axis and a Y-axis. Four upper radial sensors 107 are provided so as to be close to the upper radial electromagnets 104 and correspond to the individual upper radial electromagnets 104. As the upper radial sensor 107, an inductance sensor having, e.g., a conductive winding or an eddy current sensor is used, and the upper radial sensor 107 detects a position of the rotor shaft 113 based on change of inductance of the conductive winding which changes according to the position of the rotor shaft 113. The upper radial sensor 107 is configured to detect a radial displacement of the rotor shaft 113, i.e., the rotating body 103 fixed to the rotor shaft 113, and send the radial displacement thereof to a control device 200.

In the control device 200, for example, a compensation circuit having a PID adjustment function generates an excitation control command signal of the upper radial electromagnet 104 based on a position signal detected by the upper radial sensor 107, and an amplifier circuit 150 (described later) shown in FIG. 2 performs excitation control on the upper radial electromagnet 104 based on the excitation control command signal, whereby an upper radial position of the rotor shaft 113 is adjusted.

The rotor shaft 113 is formed of a high-permeability material (iron, stainless steel, or the like), and is attracted by magnetic force of the upper radial electromagnet 104. Such adjustment is performed in an X-axis direction and in a Y-axis direction independently. In addition, a lower radial electromagnet 105 and a lower radial sensor 108 are disposed similarly to the upper radial electromagnet 104 and the upper radial sensor 107, and adjust a lower radial position of the rotor shaft 113 similarly to the upper radial position.

Further, axial electromagnets 106A and 106B are disposed so as to vertically sandwich a disc-shaped metal disc 111 provided below the rotor shaft 113. The metal disc 111 is constituted by a high-permeability material such as iron. A configuration is adopted in which an axial sensor 109 is provided for detecting an axial displacement of the rotor shaft 113, and an axial position signal is sent to the control device 200.

In the control device 200, for example, the compensation circuit having the PID adjustment function generates an excitation control command signal of each of the axial electromagnet 106A and the axial electromagnet 106B based on the axial position signal detected by the axial sensor 109, and the amplifier circuit 150 performs excitation control on each of the axial electromagnet 106A and the axial electromagnet 106B based on the excitation control command signals, whereby the axial electromagnet 106A attracts the metal disc 111 upward with magnetic force, the axial electromagnet 106B attracts the metal disc 111 downward, and an axial position of the rotor shaft 113 is thereby adjusted.

Thus, the control device 200 properly adjusts the magnetic force exerted on the metal disc 111 by the axial electromagnets 106A and 106B to magnetically levitate the rotor shaft 113 in an axial direction and hold the rotor shaft 113 in space in a non-contact manner. Note that the amplifier circuit 150 which performs the excitation control on the upper radial electromagnets 104, the lower radial electromagnet 105, and the axial electromagnets 106A and 106B will be described later.

On the other hand, a motor 121 includes a plurality of magnetic poles which are disposed circumferentially so as to surround the rotor shaft 113. Each magnetic pole is controlled by the control device 200 so as to rotationally drive the rotor shaft 113 via an electromagnetic force acting between the magnetic pole and the rotor shaft 113. In addition, a rotational speed sensor such as, e.g., a Hall element, a resolver, or an encoder which is not shown is incorporated into the motor 121, and a rotational speed of the rotor shaft 113 is detected by a detection signal of the rotational speed sensor.

Further, a phase sensor which is not shown is mounted in the vicinity of, e.g., the lower radial sensor 108, and is configured to detect a phase of rotation of the rotor shaft 113. The control device 200 is configured to detect a position of the magnetic pole by using detection signals of both of the phase sensor and the rotational speed sensor.

A plurality of stator blades 123 (123*a*, 123*b*, 123*c* . . . ) are provided so as to be slightly spaced from the rotor blades 102 (102*a*, 102*b*, 102*c* . . . ). Each of the rotor blades 102 (102*a*, 102*b*, 102*c* . . . ) transfers a molecule of exhaust gas downward by collision, and hence each of the rotor blades 102 is formed so as to be inclined from a plane perpendicular to an axis of the rotor shaft 113 by a predetermined angle. The stator blades 123 (123*a*, 123*b*, 123*c* . . . ) are constituted by a metal such as, e.g., aluminum, iron, stainless steel, or copper, or metals such as alloys containing these metals as ingredients.

In addition, similarly, each of the stator blades 123 is also formed so as to be inclined from the plane perpendicular to the axis of the rotor shaft 113 by a predetermined angle, and the stator blades 123 are disposed so as to extend toward an inner side of the outer tube 127 and alternate with tiers of the rotor blades 102. Further, outer peripheral ends of the stator blades 123 are supported in a state in which the outer peripheral ends thereof are inserted between a plurality of stator blade spacers 125 (125*a*, 125*b*, 125*c* . . . ) which are stacked on each other.

Each of the stator blade spacers 125 is a ring-shaped member, and is constituted by a metal such as, e.g., aluminum, iron, stainless steel, or copper, or metals such as alloys containing these metals as ingredients. The outer tube 127 is fixed to outer peripheries of the stator blade spacers 125 so as to be slightly spaced from the outer peripheries thereof. A base portion 129 is disposed at a bottom portion of the outer tube 127. An outlet port 133 is formed in the base portion 129, and is caused to communicate with the outside. Exhaust gas which has entered the inlet port 101 from a side of a chamber (vacuum chamber) and has been transferred to the base portion 129 is sent to the outlet port 133.

Further, depending on usage of the turbo-molecular pump 100, a thread groove stator 131 (stator) is disposed between a portion below the stator blade spacer 125 and the base portion 129. The thread groove stator 131 is a cylindrical member constituted by metals such as aluminum, copper, stainless steel, iron, or alloys containing these metals as ingredients, and a spiral thread groove 131*a* having a plurality of threads is formed in its inner peripheral surface. A direction of a spiral of the thread groove 131*a* is a direction in which, when a molecule of the exhaust gas moves in a rotation direction of the rotating body 103, this molecule is transferred toward the outlet port 133. At the lowest portion of the rotating body 103 subsequent to the rotor blades 102 (102*a*, 102*b*, 102*c* . . . ), a cylindrical portion 102*d* is disposed so as to extend downward. An outer peripheral surface of the cylindrical portion 102*d* is cylindrical, is protruded toward an inner peripheral surface of the thread groove stator 131, and is disposed close to the inner peripheral surface of the thread groove stator 131 so as to be spaced from the inner peripheral surface thereof by a predetermined gap amount. The exhaust gas having been transferred to the thread groove 131*a* by the rotor blade 102 and the stator blade 123 is sent to the base portion 129 while being guided by the thread groove 131*a*.

The base portion 129 is a disc-shaped member constituting a base bottom portion of the turbo-molecular pump 100 and, in general, the base portion 129 is constituted by a metal such as iron, aluminum, or stainless steel. The base portion 129 physically holds the turbo-molecular pump 100 and also has a function of a heat conductive path, and hence it is preferable to use a metal having rigidity of iron, aluminum, or copper and having high heat conductivity.

In such a configuration, when the rotor blade 102 is rotationally driven together with the rotor shaft 113 by the motor 121, the exhaust gas is sucked from the chamber through the inlet port 101 by actions of the rotor blade 102 and the stator blade 123. The rotational speed of the rotor blade 102 is usually 20000 rpm to 90000 rpm, and a circumferential velocity at a tip of the rotor blade 102 reaches 200 m/s to 400 m/s. The exhaust gas sucked from the inlet port 101 passes between the rotor blade 102 and the stator blade 123 and is transferred to the base portion 129. At this point, a temperature of the rotor blade 102 rises due to frictional heat generated when the exhaust gas comes into contact with the rotor blade 102 and conduction of heat generated in the motor 121, and this heat is transmitted to a side of the stator blade 123 by radiation or conduction by a gas molecule of the exhaust gas.

The stator blade spacers 125 are bonded to each other at their outer peripheral portions, and transmit heat received from the rotor blade 102 by the stator blade 123 and frictional heat generated when the exhaust gas comes into contact with the stator blade 123 to the outside.

Note that, in the foregoing, the description has been made on the assumption that the thread groove stator 131 is disposed on the outer periphery of the cylindrical portion 102*d* of the rotating body 103, and the thread groove 131*a* is formed in the inner peripheral surface of the thread groove stator 131. However, reversely to this, there are cases where the thread groove is formed in an outer peripheral surface of the cylindrical portion 102*d*, and a spacer having a cylindrical inner peripheral surface is disposed around the outer peripheral surface thereof.

In addition, depending on usage of the turbo-molecular pump 100, in order to prevent gas sucked from the inlet port 101 from entering an electrical component portion constituted by the upper radial electromagnet 104, the upper radial sensor 107, the motor 121, the lower radial electromagnet 105, the lower radial sensor 108, the axial electromagnets 106A and 106B, and the axial sensor 109, there are cases where a surrounding portion of the electrical component portion is covered with a stator column 122, and a pressure in the stator column 122 is maintained at a predetermined pressure by purge gas.

In these cases, piping which is not shown is disposed in the base portion 129, and the purge gas is introduced through the piping. The introduced purge gas is sent to the outlet port 133 through gaps between a protection bearing 120 and the rotor shaft 113, between a rotor and a stator of the motor 121, and between the stator column 122 and an inner peripheral side cylindrical portion of the rotor blade 102.

Herein, the turbo-molecular pump 100 requires control based on identification of a model and inherent parameters which are adjusted individually (e.g., various characteristics corresponding to the model). For storing the control parameters, the above-described turbo-molecular pump 100 includes an electronic circuit portion 141 in a main body of the turbo-molecular pump 100. The electronic circuit portion 141 is constituted by electronic components such as a semiconductor memory such as an EEP-ROM and a semiconductor element for accessing the semiconductor memory, and a substrate 143 for implementing the electronic components. The electronic circuit portion 141 is housed in a lower portion of a rotational speed sensor which is not shown in the vicinity of, e.g., the center of the base portion 129 constituting a lower portion of the turbo-molecular pump 100, and the lower portion is closed by a hermetic bottom lid 145.

Incidentally, in a manufacturing process of a semiconductor, some process gases introduced into a chamber have properties which make the process gases solid when pressure of the process gases becomes higher than a predetermined value or temperature of the process gases becomes lower than a predetermined value. Inside the turbo-molecular pump 100, pressure of the exhaust gas is minimized at the inlet port 101 and is maximized at the outlet port 133. When the pressure of the process gas becomes higher than a predetermined value or the temperature thereof becomes lower than a predetermined value during transfer of the process gas from the inlet port 101 to the outlet port 133, the process gas becomes solid, and is adhered to and deposited on the inside of the turbo-molecular pump 100.

For example, in the case where $SiCl_4$ is used as a process gas in an Al etching device, it can be seen from a vapor pressure curve that a solid product (e.g., $AlCl_3$) is precipitated at a low degree of vacuum (760 [torr] to $10^{-2}$ [torr]) and at a low temperature (about 20 [° C.]) and the solid product is adhered to and deposited on the inside of the turbo-molecular pump 100. With this, when the precipitate of the process gas is deposited on the inside of the turbo-molecular pump 100, the deposit narrows a pump flow path and becomes a cause of a reduction in performance of the turbo-molecular pump 100. In addition, the above-described product is in a situation in which the product is easily coagulated and adhered in a portion in which pressure is high in the vicinity of the outlet port 133 or in the vicinity of the thread groove stator 131.

Accordingly, in order to solve this problem, conventionally, a heater which is not shown or an annular water cooled tube 149 is wound around an outer periphery of the base portion 129 or the like, a temperature sensor (e.g., a thermistor) which is not shown is embedded in, e.g., the base portion 129, and control of heating by the heater or cooling by the water cooled tube 149 is performed such that a temperature of the base portion 129 is maintained at a constant high temperature (set temperature) based on a signal of the temperature sensor (hereinafter referred to as TMS. TMS; Temperature Management System).

Next, with regard to the thus-configured turbo-molecular pump 100, a description will be given of the amplifier circuit 150 which performs excitation control on the upper radial electromagnets 104, the lower radial electromagnet 105, and the axial electromagnets 106A and 106B. FIG. 2 shows a circuit diagram of the amplifier circuit 150.

Figure 2:
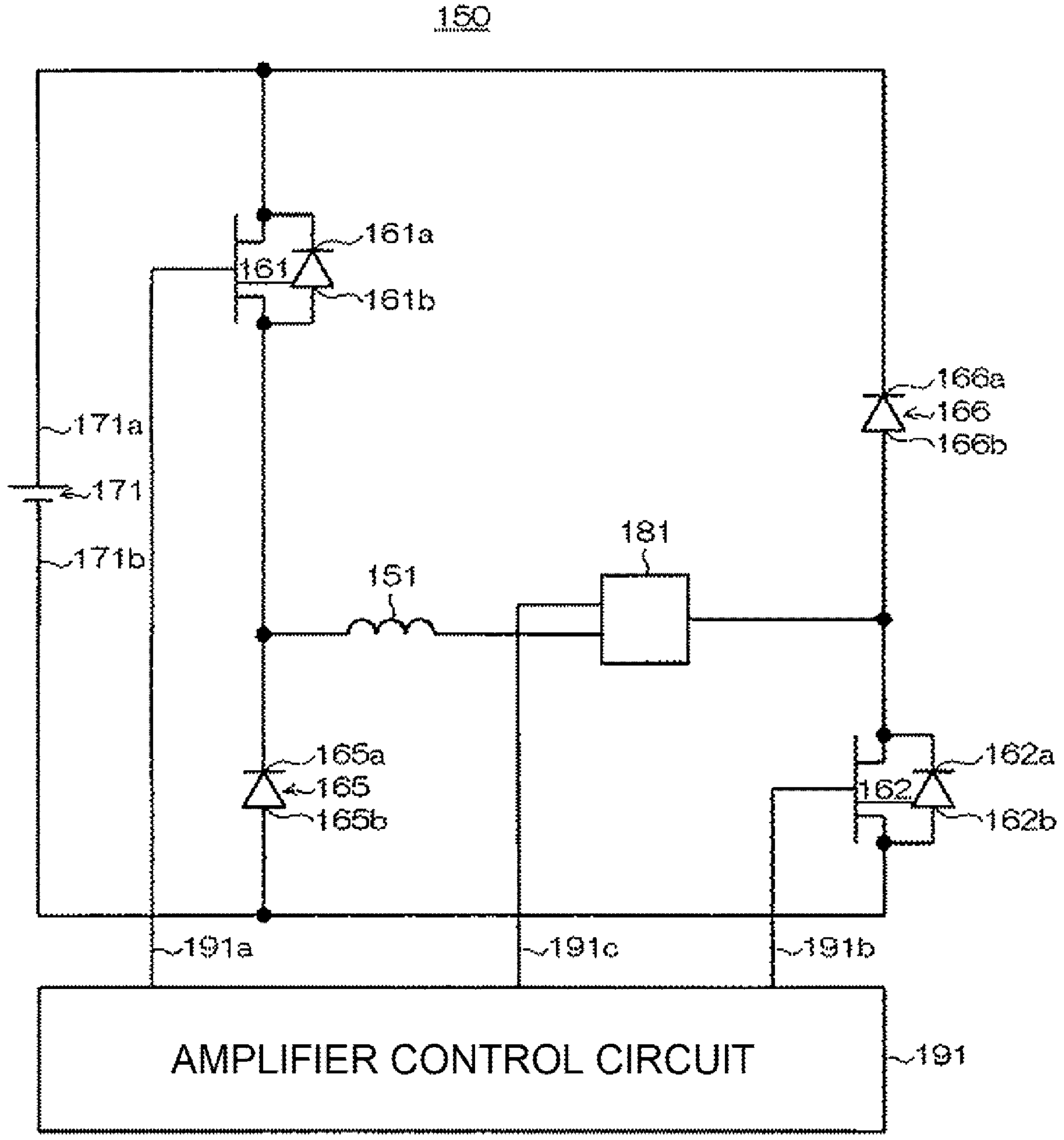
FIG. 2 is a circuit diagram of an amplifier circuit.

In FIG. 2, one end of an electromagnet winding 151 constituting the upper radial electromagnet 104 or the like is connected to a positive electrode 171*a* of a power source 171 via a transistor 161, and the other end thereof is connected to a negative electrode 171*b* of the power source 171 via a current detection circuit 181 and a transistor 162. In addition, each of the transistors 161 and 162 is a so-called power MOSFET, and has a structure in which a diode is connected between a source and a drain.

At this point, in the transistor 161, a cathode terminal 161*a* of its diode is connected to the positive electrode 171*a*, and an anode terminal 161*b* is connected to the one end of the electromagnet winding 151. In addition, in the transistor 162, a cathode terminal 162*a* of its diode is connected to the current detection circuit 181, and an anode terminal 162*b* is connected to the negative electrode 171*b*.

On the other hand, in a diode for current regeneration 165, its cathode terminal 165*a* is connected to the one end of the electromagnet winding 151, and its anode terminal 165*b* is connected to the negative electrode 171*b*. In addition, similarly to this, in a diode for current regeneration 166, its cathode terminal 166*a* is connected to the positive electrode 171*a*, and its anode terminal 166*b* is connected to the other end of the electromagnet winding 151 via the current detection circuit 181. The current detection circuit 181 is constituted by, e.g., a Hall sensor-type current sensor and an electrical resistance element.

The thus-configured amplifier circuit 150 corresponds to one electromagnet. Accordingly, in the case where a magnetic bearing is a five-axis control magnetic bearing and the total number of electromagnets 104, 105, 106A, and 106B is ten, the same amplifier circuit 150 is configured for each of the electromagnets, and ten amplifier circuits 150 are connected in parallel to the power source 171.

Further, an amplifier control circuit 191 is constituted by, e.g., a digital signal processor portion (hereinafter referred to as a DSP portion) of the control device 200 which is not shown, and the amplifier control circuit 191 is configured to switch between on/off of the transistors 161 and 162.

The amplifier control circuit 191 is configured to compare a current value (a signal in which this current value is reflected is referred to as a current detection signal 191*c*) detected by the current detection circuit 181 with a predetermined current command value. Subsequently, the amplifier control circuit 191 is configured to determine magnitudes of a pulse width (pulse width time periods Tp1 and Tp2) generated in a control cycle Ts which is one cycle by PWM control based on a comparison result. As a result, gate drive signals 191*a* and 191*b* each having this pulse width are output to gate terminals of the transistors 161 and 162 from the amplifier control circuit 191.

Note that, at the time of passage of a resonance point during acceleration operation of the rotational speed of the rotating body 103 or at the time of occurrence of disturbance during constant speed operation, it is necessary to perform position control of the rotating body 103 at high speed with a strong force. To cope with this, a high voltage of about, e.g., 50 V is used as the power source 171 such that a sharp increase (or decrease) of a current flowing to the electromagnet winding 151 is allowed. In addition, a capacitor (depiction is omitted) is usually connected between the positive electrode 171*a* and the negative electrode 171*b* of the power source 171 for stabilization of the power source 171.

In such a configuration, a current flowing to the electromagnet winding 151 (hereinafter referred to as an electromagnet current iL) is increased when both of the transistors 161 and 162 are turned on, and the electromagnet current iL is decreased when both thereof are turned off.

In addition, when one of the transistors 161 and 162 is turned on and the other one thereof is turned off, a so-called flywheel current is maintained. By flowing the flywheel current to the amplifier circuit 150 in this manner, it is possible to reduce hysteresis loss in the amplifier circuit 150 and suppress power consumption in the entire circuit to a low level. In addition, by controlling the transistors 161 and 162 in this manner, it is possible to reduce high frequency noise such as harmonics generated in the turbo-molecular pump 100. Further, by measuring the flywheel current in the current detection circuit 181, it becomes possible to detect the electromagnet current iL flowing in the electromagnet winding 151.

Figure 3:
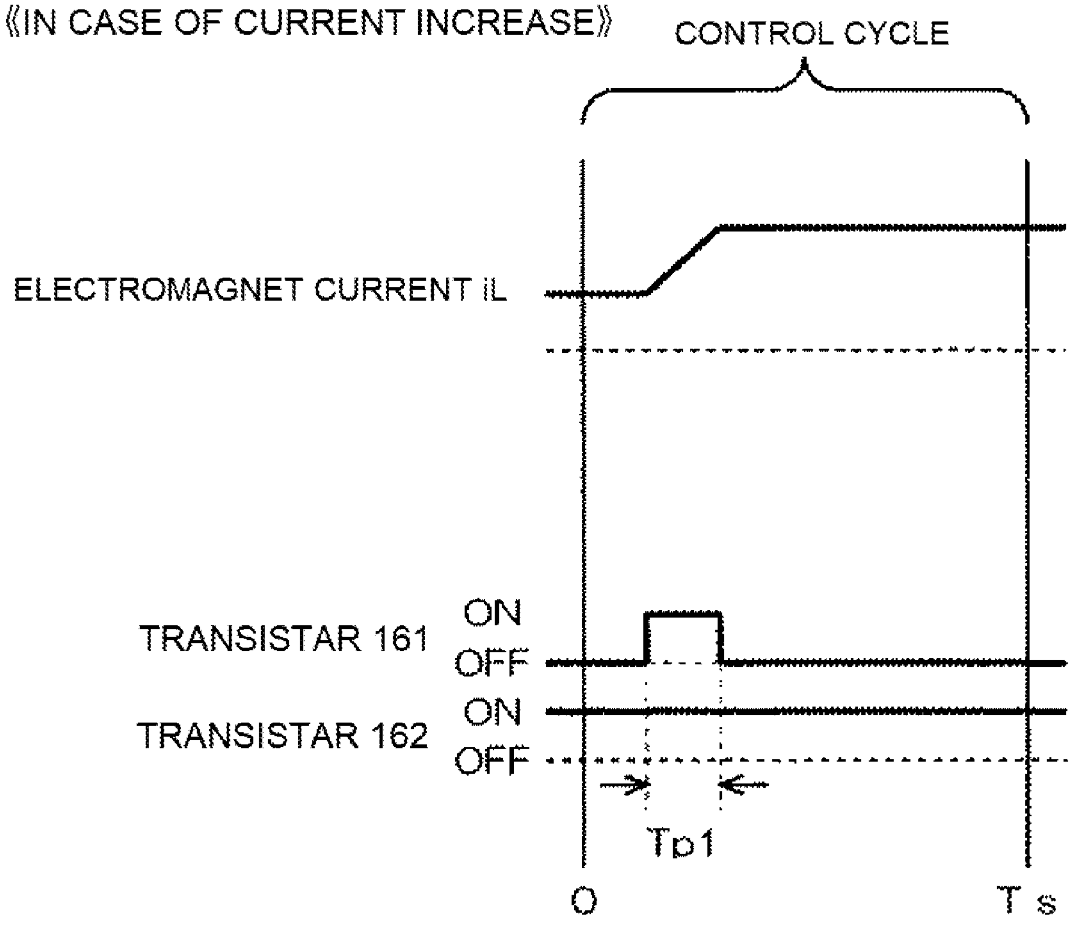
FIG. 3 is a time chart showing control in the case where a current command value is larger than a detection value.

That is, in the case where a detected current value is smaller than a current command value, as shown in FIG. 3, both of the transistors 161 and 162 are turned on only once in the control cycle Ts (e.g., 100 μs) for a time period corresponding to the pulse width time period Tp1. Consequently, the electromagnet current iL during this time period is increased toward a current value iLmax (not shown) which can be flowed from the positive electrode 171*a* to the negative electrode 171*b* via the transistors 161 and 162.

Figure 4:
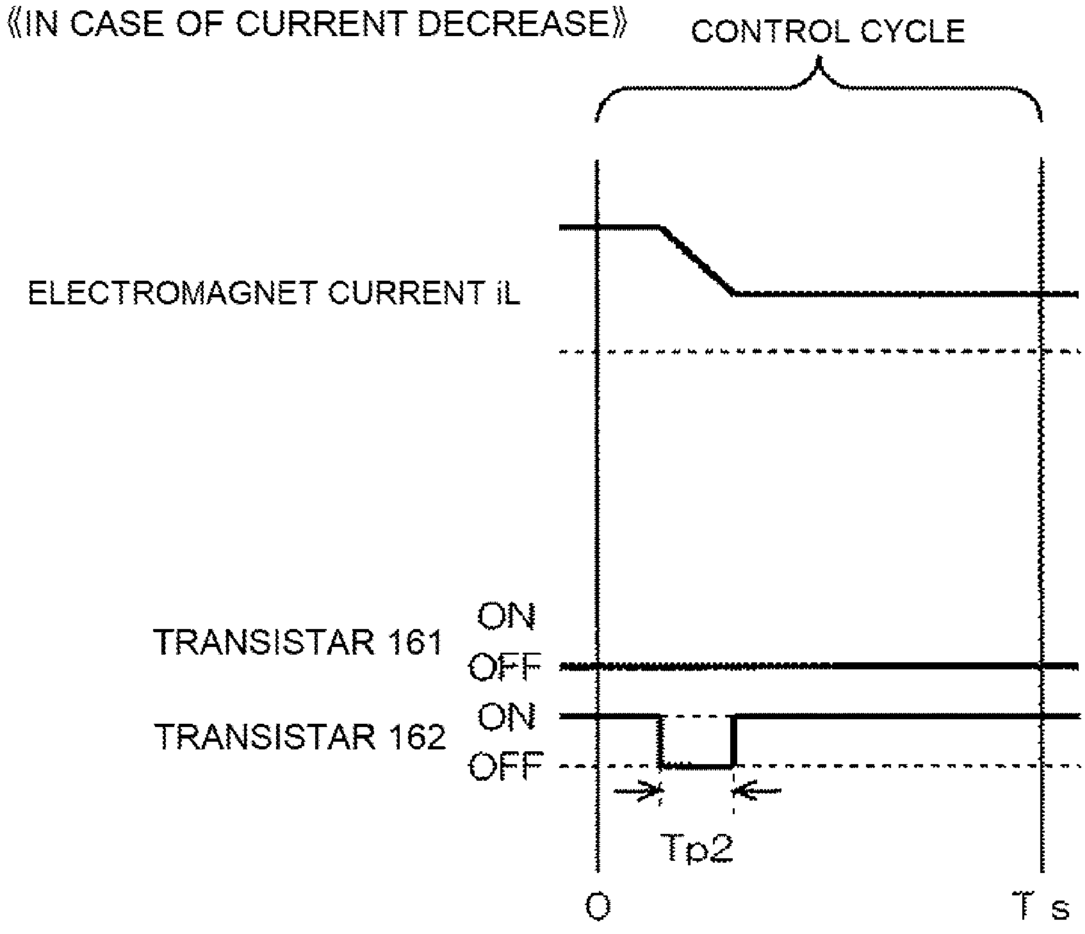
FIG. 4 is a time chart showing control in the case where the current command value is smaller than the detection value.

On the other hand, in the case where the detected current value is larger than the current command value, as shown in FIG. 4, both of the transistors 161 and 162 are turned off only once in the control cycle Ts for a time period corresponding to the pulse width time period Tp2. Consequently, the electromagnet current iL during this time period is decreased toward a current value iLmin (not shown) which can be regenerated from the negative electrode 171*b* to the positive electrode 171*a* via the diodes 165 and 166.

In either case, after a lapse of the pulse width time period Tp1 or Tp2, one of the transistors 161 and 162 is turned on. Accordingly, during this time period, the flywheel current is maintained in the amplifier circuit 150.

Figure 5:
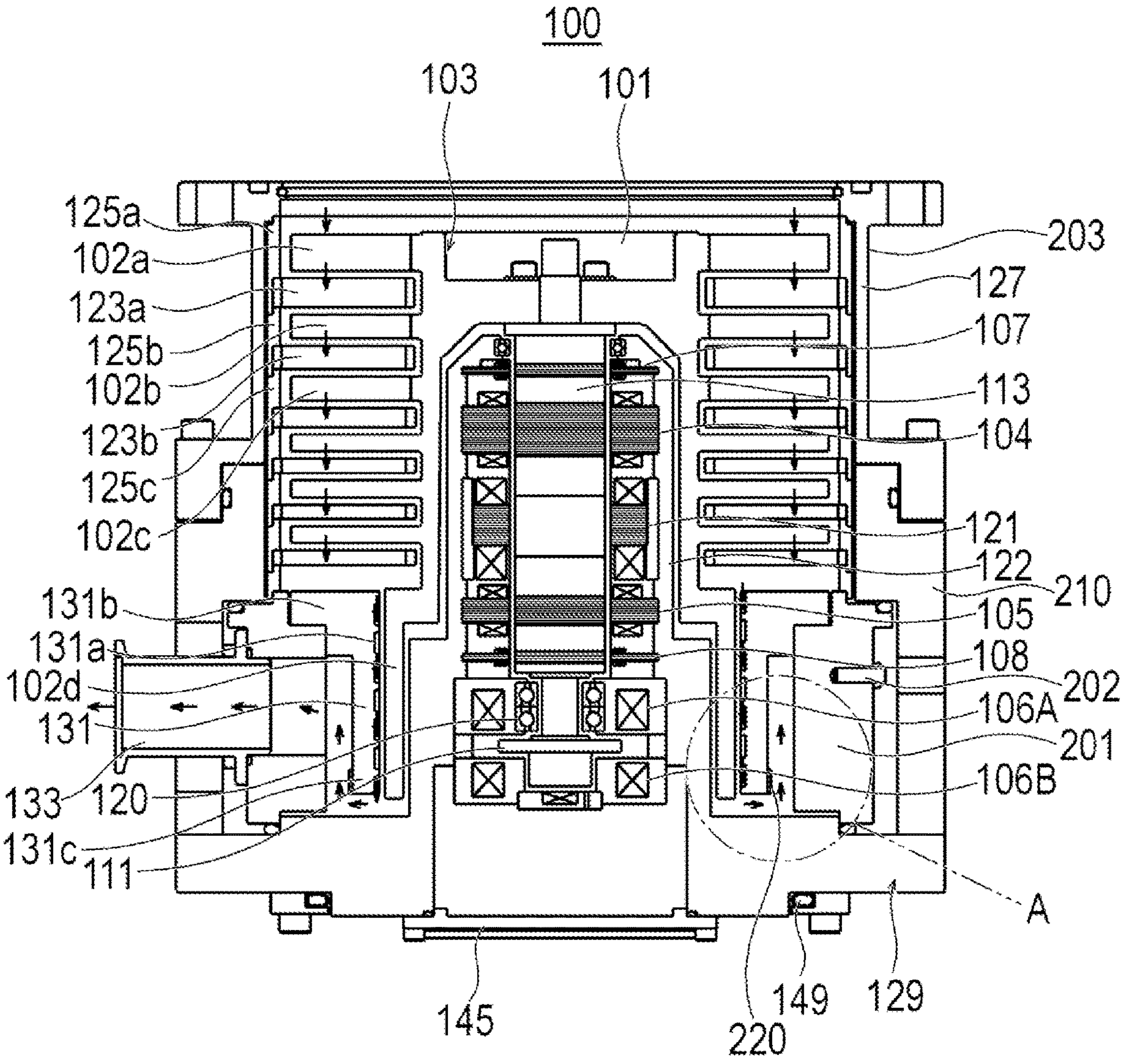
FIG. 5 is a longitudinal sectional view of the vacuum pump according to an embodiment.
Figure 6:
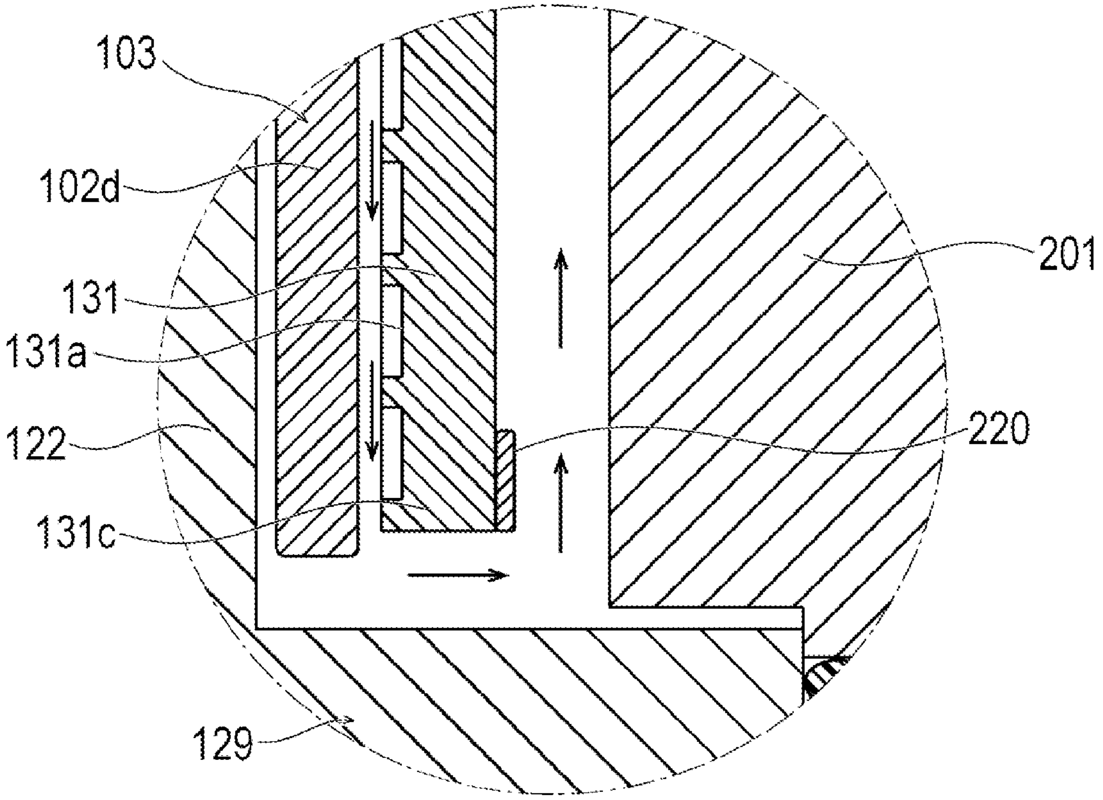
FIG. 6 is an enlarged longitudinal sectional view of an area A of FIG. 5.

As shown in FIG. 5, the vacuum pump according to the present embodiment has, in addition to the above-described configurations, a high-temperature stator 201 which is coupled to the thread groove stator 131, a heating body 202 which is housed in the high-temperature stator 201, a lower outer tube 210 which is disposed on an outer periphery of the high-temperature stator 201, and a binding means 220 which is disposed on an outer periphery of the thread groove stator 131.

An upper end side of the lower outer tube 210 is coupled to a lower side of the outer tube 127, and a lower end side of the lower outer tube 210 is coupled to an upper side of the base portion 129. The outer tube 127, the lower outer tube 210, and the base portion 129 constitute a casing 203 in which the rotating body 103 is rotatably enclosed.

The high-temperature stator 201 is substantially cylindrical, a lower end side of the high-temperature stator 201 is coupled onto the base portion 129 via an O ring, and an upper end side of the high-temperature stator 201 is coupled to the inside of the lower outer tube 210. Note that the high-temperature stator 201 in which the heating body 202 is disposed may be structured to be integral with the thread groove stator 131 instead of being structured to be separate from the thread groove stator 131.

The heating body 202 is inserted into and fixed to an internal portion of the high-temperature stator 201. The heating body 202 is connected to a heating body control device which is not shown, and the heating body control device controls a temperature of the heating body 202. The heating body 202 is appropriately adjusted such that temperatures of the high-temperature stator 201 and the thread groove stator 131 are maintained at predetermined values higher than the temperature of the rotating body 103.

The thread groove stator 131 is substantially cylindrical, and has a stator upper end portion 131*b* positioned on an upstream side, and a stator lower end portion 131*c* positioned on a downstream side. The thread groove stator 131 is coupled to the inside of the high-temperature stator 201 at the stator upper end portion 131*b*. Further, space serving as a gas flow path up to the outlet port 133 is provided on an outer peripheral side of the thread groove stator 131, and the thread groove stator 131 extends downward from the stator upper end portion 131*b* such that the stator lower end portion 131*c* becomes a free end. The stator lower end portion 131*c* is spaced from the outer peripheral surface of the cylindrical portion 102*d* of the rotating body 103 which is disposed on an inner peripheral side with a gap formed between the stator lower end portion 131*c* and the outer peripheral surface thereof, and is also spaced from an inner peripheral surface of the high-temperature stator 201 which is disposed on an outer peripheral side with a gap formed between the stator lower end portion 131*c* and the inner peripheral surface thereof. Note that an outer peripheral surface of the stator lower end portion 131*c* may face an inner peripheral surface of another member (e.g., the casing 203 such as the outer tube 127 or the lower outer tube 210 or another stator member disposed inside the casing 203) instead of facing the inner peripheral surface of the high-temperature stator 201.

The binding means 220 is cylindrical, and is disposed on the outer periphery of the thread groove stator 131. An inner peripheral surface of the binding means 220 is in contact with the outer peripheral surface of the stator lower end portion 131*c*. For example, the binding means 220 is press-fitted into and fixed to the stator lower end portion 131*c*. Note that a method of fixing the binding means 220 to the thread groove stator 131 is not particularly limited, and the binding means 220 may also be fixed thereto by, e.g., a bolt or the like. An outer peripheral surface of the binding means 220 faces the inner peripheral surface of the high-temperature stator 201 with a gap formed between the outer peripheral surface thereof and the inner peripheral surface thereof. It is preferable that edge portions on an axial side of the inner peripheral surface and the outer peripheral surface of the binding means 220 are chamfered with a curved surface or a flat surface. Note that an axial direction of the cylindrical binding means 220 is a direction in which centers of two opening portions of the cylinder are joined.

An axial length and a radial thickness of the binding means 220 are not particularly limited. The binding means 220 is formed of a material having a linear expansion coefficient lower than that of a material of the thread groove stator 131. For example, in the case where the material of the thread groove stator 131 is aluminum or an aluminum alloy, it is possible to suitably use, e.g., stainless steel, ceramic, or a titanium alloy as the material of the binding means 220. Stainless steel is not particularly limited, and it is possible to suitably use SUS400 series such as, e.g., SUS403, SUS405, SUS410, and SUS430.

Note that the outer peripheral surface of the binding means 220 may face an inner peripheral surface of another member (e.g., the casing 203 such as the outer tube 127 or the lower outer tube 210 or another stator member disposed inside the casing 203) instead of facing the inner peripheral surface of the high-temperature stator 201. A shape of the binding means 220 is a cylindrical shape having a constant inner diameter and a constant outer diameter in the axial direction, but the shape of the binding means 220 is not limited thereto. For example, the outer diameter of the binding means 220 does not need to be constant in the axial direction.

Next, an operation of the above-described vacuum pump will be described. When the rotating shaft 113 of the vacuum pump is driven by the motor 121 serving as a drive mechanism, the rotating body 103 rotates. With this, the exhaust gas from the chamber is sucked through the inlet port 101 by actions of the rotor blade 102 and the stator blade 123.

The exhaust gas sucked from the inlet port 101 is transferred to the downstream side by a turbo-molecular pump mechanism formed by the rotor blade 102 and the stator blade 123. The exhaust gas transferred to the downstream side is guided to a Holweck pump mechanism formed by the cylindrical portion 102*d* of the rotating body 103 and the thread groove stator 131, and is then transferred to the outlet port 133.

The thread groove stator 131 and the high-temperature stator 201 are heated by the heating body 202 to prevent a reaction product generated in the semiconductor manufacturing or the like from being deposited. In the case where the cylindrical portion 102*d* and the thread groove stator 131 are formed of materials having substantially the same linear expansion coefficients, the thread groove stator 131 having a temperature higher than that of the cylindrical portion 102*d* thermally expands more significantly than the cylindrical portion 102*d* without the binding means 220. As an example, the cylindrical portion 102*d* and the thread groove stator 131 are made of aluminum, and the binding means 220 is made of stainless steel. Note that a diameter of the inner cylindrical portion 102*d* is increased also by a centrifugal force but, even when its diameter increase amount is taken into consideration, the thread groove stator 131 tends to thermally expand more significantly than the cylindrical portion 102*d*. Accordingly, in the case where the binding means 220 is not present, a gap amount between the outer peripheral surface of the cylindrical portion 102*d* and the inner peripheral surface of the thread groove stator 131 is increased, and the performance of the thread groove pump is reduced. However, the binding means 220 formed of a material having the linear expansion coefficient lower than that of the material of the thread groove stator 131 is disposed on the outer periphery of the thread groove stator 131. Even when the binding means 220 is heated to have the same temperature as that of the thread groove stator 131, the binding means 220 does not thermally expand as significantly as the thread groove stator 131. Accordingly, the thermal expansion of the thread groove stator 131 to an outer side in a radial direction is suppressed by the binding means 220. Consequently, it is possible to properly maintain the gap amount between the outer peripheral surface of the cylindrical portion 102*d* and the inner peripheral surface of the thread groove stator 131 between which gas flows.

The binding means 220 is cylindrical, and hence the binding means 220 has a uniform structure in a circumferential direction, and its outer periphery is spaced from other members. Accordingly, the binding means 220 can bind the thread groove stator 131 with a binding force which is uniform in the circumferential direction, and hence it is possible to uniformly maintain the gap amount between the outer peripheral surface of the cylindrical portion 102*d* and the inner peripheral surface of the thread groove stator 131 at a proper amount.

The present vacuum pump may have a plurality of specifications having different internal temperatures. As an example, the internal temperature in the Holweck pump mechanism of the vacuum pump is set in a range of 70° C. to 200° C. The internal temperature in the Holweck pump mechanism is a temperature of a component (the cylindrical portion 102*d* and/or the thread groove stator 131) constituting the pump mechanism. The gap amount between the outer peripheral surface of the cylindrical portion 102*d* and the inner peripheral surface of the thread groove stator 131 of the present vacuum pump in each specification (internal temperature) is preferably within a proper range, is more preferably substantially constant, and is further preferably constant. That is, it is preferable that, even when the internal temperature changes within the range of the specification, by providing the binding means 220 on the outer periphery of the thread groove stator 131, the gap amount between the outer peripheral surface of the cylindrical portion 102*d* and the inner peripheral surface of the thread groove stator 131 scarcely changes. Note that the proper gap amount between the outer peripheral surface of the cylindrical portion 102*d* and the inner peripheral surface of the thread groove stator 131 is, e.g., 200 to 1000 μm. Note that the gap amount between the outer peripheral surface of the cylindrical portion 102*d* and the inner peripheral surface of the thread groove stator 131 can change during one rotation due to deflection by rotation of the rotating body 103. The vacuum pump may issue a warning sound in the case where the measured deflection of the rotating body 103 reaches a threshold value (e.g., 100 μm) such that the outer peripheral surface of the cylindrical portion 102*d* and the inner peripheral surface of the thread groove stator 131 don't come into contact with each other.

When temperatures of the thread groove stator 131 and the binding means 220 rise, the thread groove stator 131 receives stress from the binding means 220. There are cases where the material of the thread groove stator 131 is a material which deforms more easily than stainless steel or the like such as aluminum or an aluminum alloy. Consequently, it is preferable that the stress acting on the thread groove stator 131 from the binding means 220 is less than yield stress of the material of the thread groove stator 131 such that the thread groove stator 131 does not plastically deform. In particular, in the case where the vacuum pump has a plurality of specifications having different internal temperatures of the thread groove stator 131, it is preferable that the stress acting on the thread groove stator 131 from the binding means 220 in each specification (internal temperature) is less than the yield stress of the material of the thread groove stator 131. That is, even when the internal temperature changes within the range of the specification, the stress acting on the thread groove stator 131 is always less than the yield stress, and it is possible to suppress plastic deformation of the thread groove stator 131.

Thus, the vacuum pump according to the present embodiment includes the casing 203 in which the inlet port 101 is provided, the rotating body 103 which is enclosed in the casing 203 and is rotatably supported, the substantially cylindrical thread groove stator 131 which is disposed on the outer periphery of the rotating body 103, and the thread groove 131*a* which is formed in at least one of the outer peripheral surface of the rotating body 103 and the inner peripheral surface of the thread groove stator 131, and exhausts gas sucked from the side of the inlet port 101 to the outside of the casing 203 by rotating the rotating body 103, and the binding means 220 which is formed of the material having the linear expansion coefficient lower than that of the material of the thread groove stator 131 and reduces radial deformation at the time of thermal expansion of the thread groove stator 131 is disposed on the outer periphery of the thread groove stator 131. With this, the vacuum pump has the binding means 220 which reduces the radial deformation at the time of the thermal expansion of the thread groove stator 131, and hence it is possible to suppress an increase in the gap amount between the outer peripheral surface of the rotating body 103 and the inner peripheral surface of the thread groove stator 131. Accordingly, the present vacuum pump can effectively suppress a reduction in the performance of the thread groove pump caused by the thermal expansion.

In addition, the binding means 220 is disposed at the end portion on the downstream side of the thread groove stator 131. With this, it is possible to suppress thermal expansion in the radial direction of the end portion on the downstream side of the thread groove stator 131 of which the outer peripheral surface is not fixed on the downstream side, and effectively suppress a reduction in the performance of the thread groove pump.

Further, the vacuum pump may have a plurality of specifications having different internal temperatures, and the gap amounts, each of which is between the outer peripheral surface of the rotating body 103 and the inner peripheral surface of the thread groove stator 131 at a predetermined position in an axial direction of the vacuum pump in each of the individual specifications, may be made equal to each other by the binding means 220. With this, the present vacuum pump can effectively maintain the performance of the thread groove pump in the individual specifications having different internal temperatures.

In addition, the stress acting on the thread groove stator 131 from the binding means 220 at the time of the thermal expansion of the thread groove stator 131 may be made less than the yield stress of the material of the thread groove stator 131. With this, it is possible to effectively prevent damage to the thread groove stator 131 which is bound by the binding means 220 and receives the stress at the time of the thermal expansion.

Note that the present invention is not limited only to the above-described embodiment, and various changes can be made by those skilled in the art within the technical ideas of the present invention. For example, in the present embodiment, while the outer peripheral surface of the cylindrical portion 102*d* is smooth and the thread groove is formed in the inner peripheral surface of the thread groove stator 131, the thread groove may also be formed in the outer peripheral surface of the cylindrical portion 102*d*, and the inner peripheral surface of the stator on its outer side may be smooth. In addition, the thread groove pump on the downstream side of the vacuum pump may also be formed by combining a Siegbahn pump mechanism and the Holweck pump mechanism. Further, the thread groove stator 131 may has a structure in which the thread groove stator 131 is coupled to the high-temperature stator 201 at an end portion on the downstream side, or a structure in which the thread groove stator 131 is coupled thereto at a central portion in a flow direction. Consequently, the binding means 220 may also be disposed at the end portion on the downstream side or the central portion in the flow direction instead of the end portion on the upstream side of the thread groove stator 131.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A vacuum pump comprising:

a casing in which an inlet port is provided;

a rotating body which is enclosed in the casing and is rotatably supported;

a stator which is substantially cylindrical and is disposed on an outer periphery of the rotating body; and a thread groove which is formed in at least one of an outer peripheral surface of the rotating body and an inner peripheral surface of the stator, the vacuum pump exhausting gas sucked from a side of the inlet port to outside of the casing by rotating the rotating body, wherein the stator extending downward from an upper end portion of the stator and having a lower extremity that is a free end, and a cylindrical member, which is formed of a material having a linear expansion coefficient lower than a linear expansion coefficient of a material of the stator and reduces radial deformation at a time of thermal expansion of the stator, being disposed on an outer periphery of the stator and at the lower extremity of the stator.

2. The vacuum pump according to claim 1, wherein the cylindrical member is disposed at an end portion on a downstream side of the stator.

3. The vacuum pump according to claim 1, wherein the vacuum pump has a plurality of specifications having different internal temperatures, and gap amounts, each of which is between the outer peripheral surface of the rotating body and the inner peripheral surface of the stator at a predetermined position in an axial direction of the vacuum pump in each of the individual specifications, are made equal to each other by the cylindrical member.

4. The vacuum pump according to claim 1, wherein stress acting on the stator from the cylindrical member at the time of the thermal expansion of the stator is made less than yield stress of the material of the stator.

5. The vacuum pump according to claim 1, wherein an entire inner peripheral surface of the cylindrical member is in contact with an outer peripheral surface of the stator at a position of the free end of the stator.

* * * * *